Feb. 24, 1959 P. A. TOENSMEIER 2,874,833
CAN CARRIER
Filed Jan. 30, 1956 9 Sheets-Sheet 1

INVENTOR
Patrick A. Toensmeier
BY
Pennie Edmonds Morton Barrows Taylor
ATTORNEYS

Feb. 24, 1959 P. A. TOENSMEIER 2,874,833
CAN CARRIER
Filed Jan. 30, 1956 9 Sheets-Sheet 4

FIG. 8

INVENTOR
Patrick A. Toensmeier
BY
Pennie Edmonds Morton Barrows Taylor
ATTORNEYS Feb. 24, 1959   P. A. TOENSMEIER   2,874,833
CAN CARRIER Filed Jan. 30, 1956   9 Sheets-Sheet 5

INVENTOR
Patrick A. Toensmeier
BY
Pennie Edmonds Morton Barrows Taylor
ATTORNEYS Feb. 24, 1959 P. A. TOENSMEIER 2,874,833
CAN CARRIER
Filed Jan. 30, 1956 9 Sheets-Sheet 6

Feb. 24, 1959 P. A. TOENSMEIER 2,874,833
CAN CARRIER
Filed Jan. 30, 1956 9 Sheets-Sheet 8

INVENTOR
Patrick A. Toensmeier
BY
ATTORNEYS

Feb. 24, 1959  P. A. TOENSMEIER  2,874,833
CAN CARRIER

Filed Jan. 30, 1956  9 Sheets-Sheet 9

FIG. 16

United States Patent Office 2,874,833
Patented Feb. 24, 1959

2,874,833
CAN CARRIER

Patrick A. Toensmeier, Hamden, Conn., assignor to The New Haven Board & Carton Company, New Haven, Conn., a corporation of Connecticut Application January 30, 1956, Serial No. 562,262

10 Claims. (Cl. 206—65)

This invention has to do with cartons of paperboard for holding a plurality of like articles and is concerned more particularly with a novel carton for use in the shipment, display, and distribution of a plurality of cans with flat ends surrounded by chimes, such as those used for beer, scouring powders, etc. The new carton is superior to prior similar cartons, in that it is a rigid structure capable of holding a plurality of cans so securely that there is little likelihood of their being accidentally dislodged. In addition, the cans in the new carton are exposed from end to end throughout one-half their circumference, so that the loaded cartons may be placed on display with the can labels visible.

The carton of the invention provides a plurality of compartments for individual cans, and each compartment is formed of a pair of walls lying substantially at right angles to each other and connected at the top and bottom by end walls triangular in shape. The end walls are spaced to receive a can snugly between them and each such wall is provided with means operating automatically upon insertion of a can into the compartment to engage the chime of the can and prevent dislodgment of the can. The chime engaging means comprise flaps cut from the end walls of the compartments and so formed as to extend normally toward the interior of the compartment. The flaps are displaceable by the chimes of a can being inserted into the compartment to permit the chimes to pass beyond the flaps, after which the flaps resume their normal positions and thus lie with their ends in position to engage the inner surfaces of the chimes and prevent removal of the can from the compartment.

In its simplest form, the new carton provides compartments for a pair of cans, but it can be made in various forms for holding three or more cans and it can be made with and without a handle. In some forms, the handle is an integral part of the blank, of which the carton is formed, while, in others, the handle is made a part separate from the main blank and made of a material of greater strength.

For a better understanding of the invention, reference should be made to the accompanying drawings, in which.

Figures 1, 2, 3:
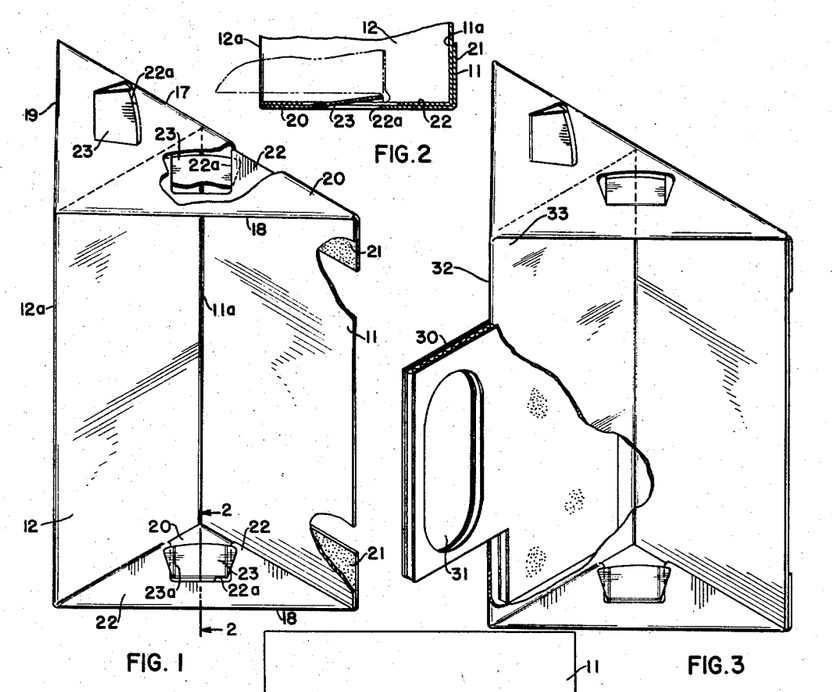
Fig. 1 is a perspective view of one form of the new carton with parts broken away.
Fig. 2 is a fragmentary sectional view taken along line 2—2 of Fig. 1.
Fig. 3 is a perspective view of a second form of the new carton with parts broken away.
Figure 4:
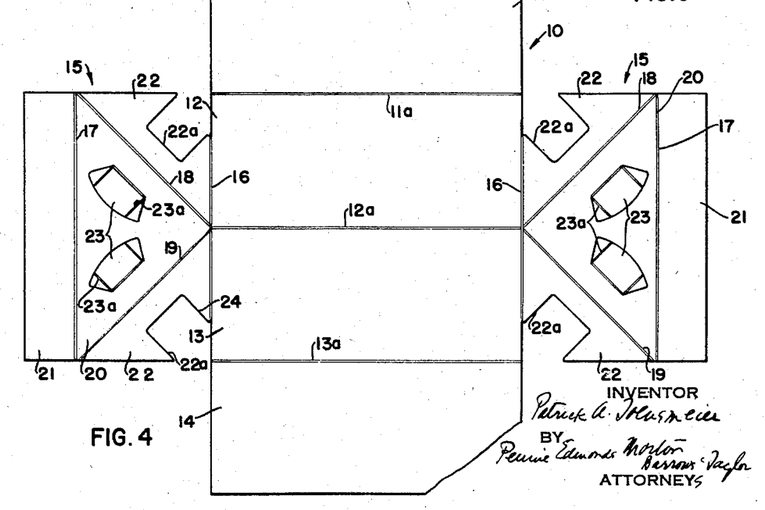
Fig. 4 is a plan view of the blank used in forming the carton of Fig. 1.

The carton of Fig. 1 holds two cans and is formed of a flat blank 10 of paperboard or similar material shown in Fig. 4. The blank 10 comprises a rectangular central portion subdivided by crease lines 11a, 12a, 13a into four rectangular panels 11, 12, 13, and 14, which form the side wall members of the carton and are ordinarily of the same size. Rectangular panels 15 are attached to the end edges of the walls 12, 13 along crease lines 16 and each panel 15 is divided by crease lines 17, 18, and 19 into a triangular end wall 20 lying with its apex at one end of crease line 12a, a glue flap 21 hinged to the base of the end wall, and triangular holding walls 22 attached at their bases to the sides of end wall 20 and along one of their side walls to the ends of side walls 12, 13. Each holding wall has a recess 22a extending inward from its base toward its apex and the sides of the recess lie parallel. Each end wall has a pair of retaining flaps 23 cut therefrom, each flap having a root lying parallel to one of the sides 18, 19 of the end wall and extending toward the base 17 of the end wall. Each retaining flap has a pair of parallel crease lines extending outward from its root to its free end and forming side wings 23a, the distance between the crease lines being substantially the width of a recess 22a.

To erect the carton of Fig. 1, the side walls 12 and 13 are first folded along crease line 12a to place the walls back to back. As this operation is performed, the end walls 20 are folded toward the end edges of the walls 12, 13, and, simultaneously, the holding walls are folded along crease lines 16, 18, 19, until walls 22 lie against the inner surfaces of end walls 20. The bases 17 of end walls 20 now lie aligned with the ends of the crease lines 11a, 13a and at right angles to the walls 12, 13. The side walls 11 and 14 are next bent on crease lines 11a, 13a to lie in the same plane and with their edges extending along the bases 17 of end walls 20 and the glue flaps 21 are folded toward each other on crease lines 17, until the flaps lie against the surfaces of the side walls. Before the glue flaps are folded as described, their surfaces, which are to engage the side walls 11, 14 are given a coating of glue, so that the flaps can be secured to the side walls.

The erected carton, as shown in Fig. 1, provides two generally triangular compartments which lie side by side and are separated by side walls 12, 13 lying in contact. Each compartment is adapted to receive a chimed can with about 180° of the circumference of the can exposed and the can is held firmly in position by the retaining flaps. For this purpose, as the carton is erected and each retaining flap 23 overlies a notch 22, the flap is pushed inwardly through the notch. In this operation, the wings on the flap are folded to lie parallel and passed through the notch, after which the wings are released and lie against the inner faces of the holding wall. Each retaining flap is thus held by its flaps, so that it projects inwardly into a compartment beyond the inner surface of an end wall of the compartment.

When a can is inserted into a compartment until the side of the can engages the side walls of the compartment, such as the side walls 11, 12, the chimes at each end move past the free ends of retaining flaps 23, the latter being pushed outwardly by the chimes as the can is inserted. As soon as the chimes pass beyond the free ends of the flaps, the flaps spring back and their ends lie in opposition to the inner surfaces of the chimes and thus prevent accidental removal of the can from the compartment.

The carton illustrated in Fig. 3 is the same as that shown in Fig. 1, except the Fig. 3 carton is provided with a handle 30 of corrugated board or the like. The handle 30 is T-shaped and its leg is provided with an elongated opening 31 forming a hand grip. The crease line between the walls 33 of the carton, which lie in contact, is formed with an opening, through which the leg of the handle is inserted and the cross-bar of the handle then lies between and is secured to the walls 33.

Figure 5:
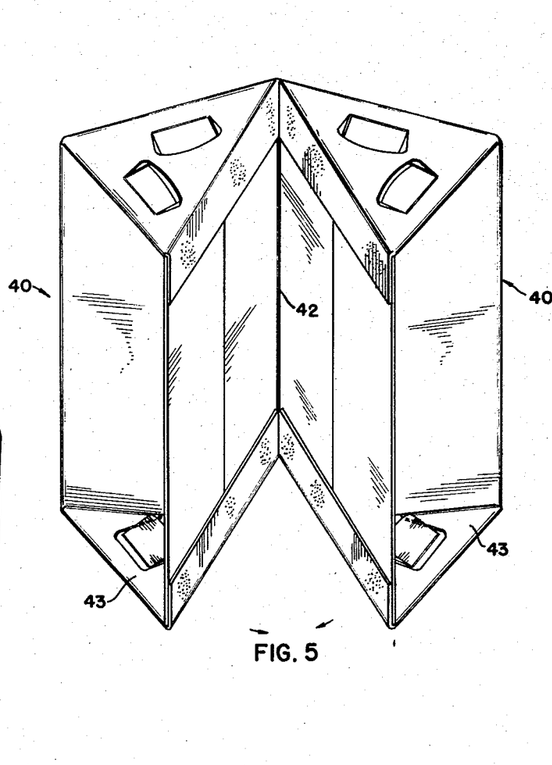
Fig. 5 is a perspective view of a third form of the new carton partly erected.
Figure 7:
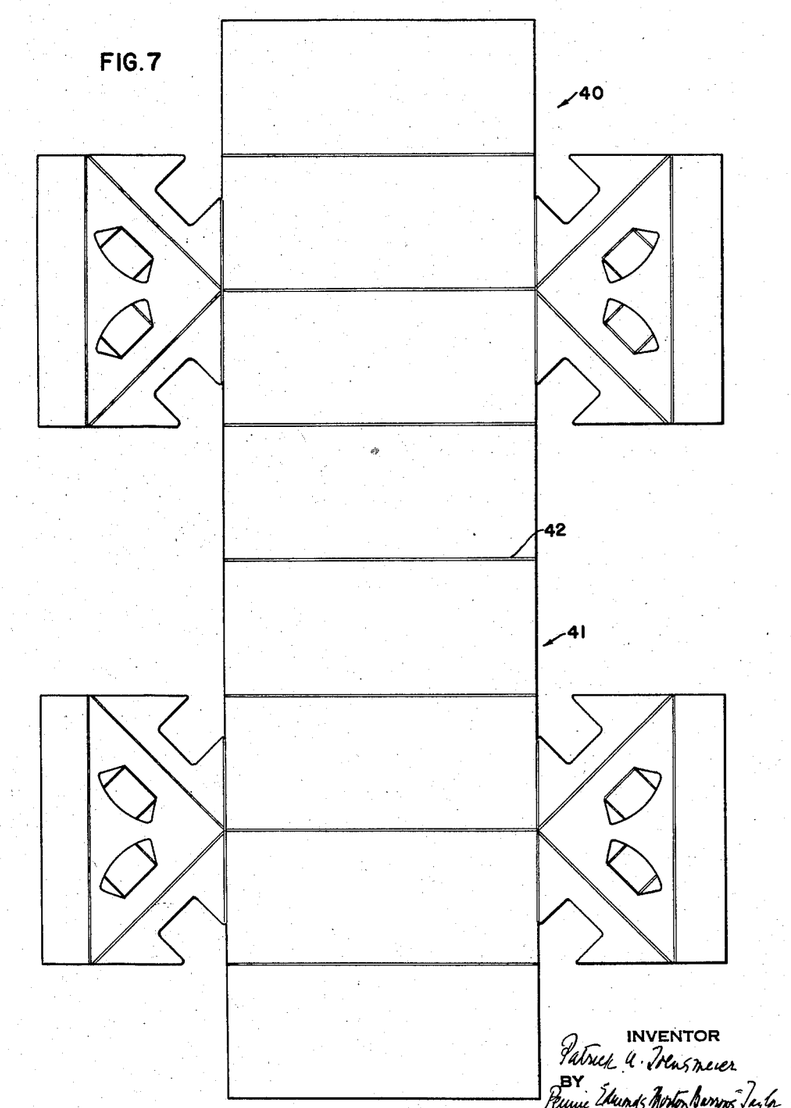
Figs. 7 and 8 are plan views of the blanks used in forming the cartons of Figs. 5 and 6, respectively.

The carton shown in Fig. 5 is for four cans and may be considered to be made of two cartons as shown in Fig. 1 disposed back to back. The Fig. 5 carton is made from the blank of Fig. 7, which is formed of identical sections 40, 41 separated by a crease line 42. Each section is the same in form as the blank of Fig. 4.

To erect the carton of Fig. 5, the sections 40, 41 of the blank are individually folded in the same manner as the blank of Fig. 4 and this provides a pair of carton sections as shown in Fig. 1, the sections being hinged together along one side edge and each providing compartments for two cans. To complete the carton, the two carton sections are folded on crease line 42 to place them back to back, after which the sections are secured together in any desired manner. The completed carton is generally rectangular in shape and has four outwardly opening compartments 43 with chime-retaining means at their opposite ends. A can retained in each compartment will project out of the compartment with half its circumference exposed.

Figure 6:
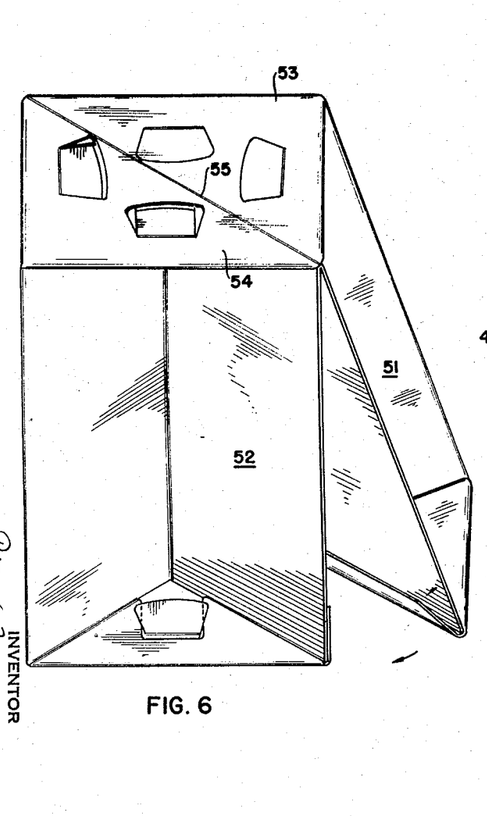
Fig. 6 is a perspective view of a fourth form of the new carton partly erected.

The carton of Fig. 6, like that of Fig. 5, comprises back to back pairs of two-compartment assemblies, but, in the carton of Fig. 6, the assemblies are hinged together at one end rather than along a side, as in the carton of Fig. 5.

Figure 8:
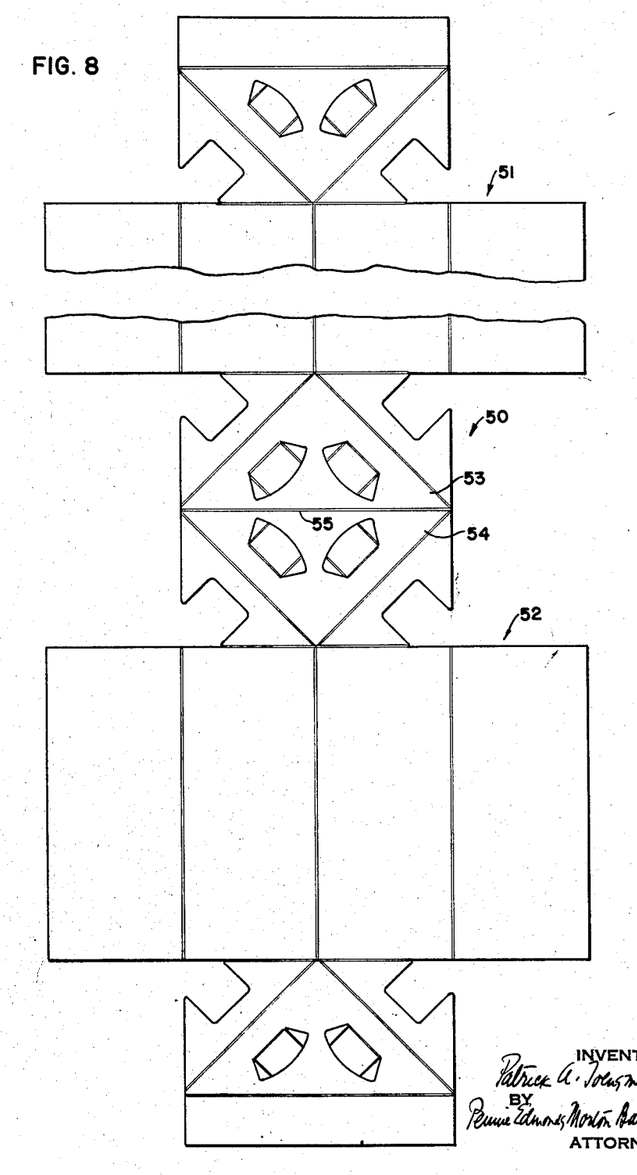

The blank 50 for the carton of Fig. 6 is shown in Fig. 8 as made up of two sections 51 and 52, which may be substantially identical to the blank of Fig. 4 and have end walls 53, 54, the bases of which are connected along a crease line 53.

The carton of Fig. 6 is erected in the same manner as the carton of Fig. 5, in that the sections 51, 52 of the blank are first folded to form the pair of two-compartment assemblies. The assemblies are attached along the crease line 55 and are folded back to back along that line and secured together to complete the four-compartment carton.

Either of the cartons of Fig. 5 and Fig. 6 may be provided with a T-shaped handle of the type illustrated in Fig. 3. Such a handle is mounted in place by passing its leg through an opening in the crease line, along which the two sections of the blank are folded to place the two parts of the carton back to back.

Figure 9:
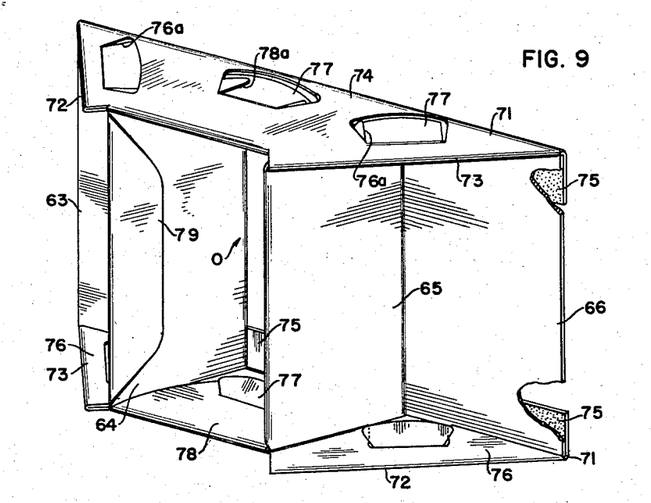
Fig. 9 is a perspective view of a fifth form of the new carton with parts broken away.
Figure 10:
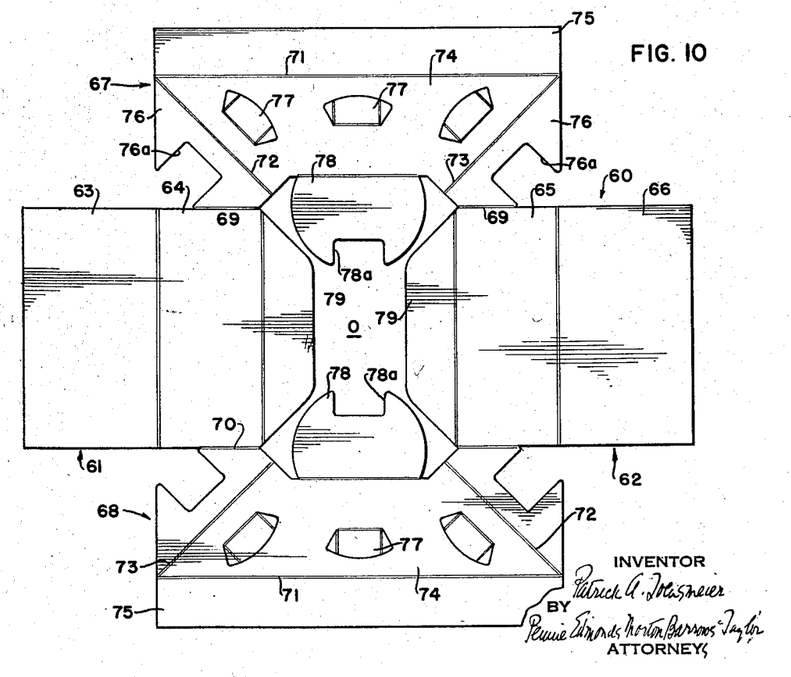
Fig. 10 is a plan view of the blank used in forming the carton of Fig. 9.

The carton of Fig. 9 provides two single can compartments, which are spaced apart and connected by elongated end walls, so that the parallel side walls of the end compartments lie spaced and partially define a central compartment between them for the reception of a third can. The blank 60, used in forming the carton in Fig. 9, has a pair of spaced panels 61 and 62 divided by crease lines to form side walls 63, 64, 65, and 66. Panels 67 and 68 are attached to the side walls 64, 65 along crease lines 69, 70 and the panels 61, 62, 67, and 68 define a central opening O through the blank. The panels 67, 68 are subdivided by crease lines 71, 72, and 73 in somewhat triangular arrangement to form an end wall 68 of generally trapezoidal form, a glue flap 75 attached to the wide outer edge of the end wall, and holding walls 76 attached to the converging side edges of the end walls 74 and to the edges of the side walls 64, 65 at one end thereof. The end walls 74 are longer by the diameter of a can than the end walls 20 of the carton of Fig. 1, and retaining flaps 77 are cut out of the end walls 74 adjacent the side edges thereof and also in the central portion thereof. The free ends of each center retaining flap extend toward the base of an end wall 74 defined by a crease line 71, while the free ends of the outer retaining flaps extend away from the side edges of the end wall 74 as defined by crease lines 72 and 73. The holding walls 76 connect the side edges of the end walls 74 with the end edges of side walls 64, 65, and each holding wall has a notch 76a for receiving a retaining flap. A pair of holding flaps 78 are hinged to the narrow inner end edges of end walls 74 and lie within the opening O. Each flap 78 has a notch 78a in its free edge and may be folded against the inner surface of an end wall to be interlocked with a center retaining flap 77 to hold the latter in can-engaging position and projecting into the central compartment of the carton. A pair of narrow side wall flaps 79 are connected to the opposed inner edges of side walls 64, 65 and lie within opening O.

To erect the carton of Fig. 9, the panels 67, 68 are folded along crease lines 72, 73, and 69 to move the end wall 74 toward parallel positions and this operation moves the side walls 64, 65 between the end walls 74, until the side walls are parallel to each other and at the right angles to the bases 71 of the end walls. The side walls 63, 66 are next folded to lie at right angles to walls 64, 65 and in the same plane. Walls 63, 66 then extend along the crease lines 71, so that two triangular compartments are formed at each end of the carton. The glue flaps 75 are then folded inwardly upon the walls 63, 64 and secured thereto to hold the carton in erected condition and the side wall flaps 79 are folded inwardly and secured against the adjacent faces of walls 64, 65. The retaining flaps 77 at the ends of the outer compartments of the carton are next interlocked with the notches of the adjacent holding walls and the holding flaps 78 are folded against the inner faces of walls 74 and interlocked with the center retaining flaps.

When the carton of Fig. 9 is erected, as described, the spaced side walls 64, 65 and side wall flaps secured thereto define a central compartment closed at its ends by the central portions of end walls 74 and partially closed at the back by central portions of the glue flaps 75. The compartment thus formed may be loaded from the front of the carton and the can within it is held firmly in place by engagement of the center retaining flaps with its chimes. At the same time, about half the circumference of the can is visible through the open front of the compartment.

Figure 11:
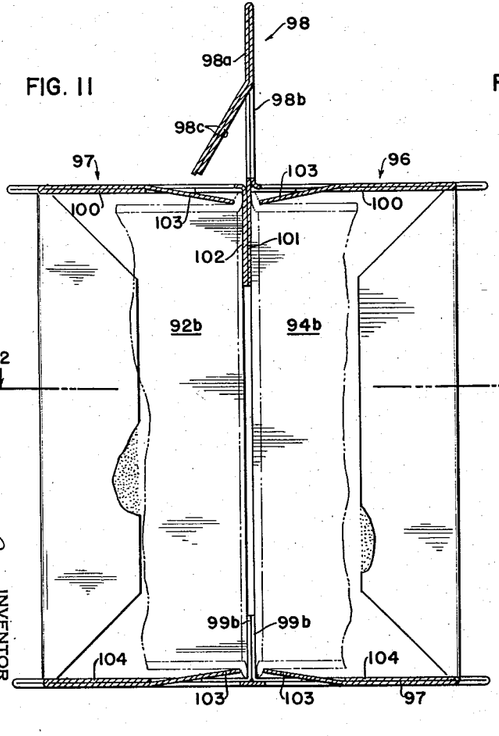
Fig. 11 is a sectional view of a sixth form of the new carton with parts broken away.
Figure 12:
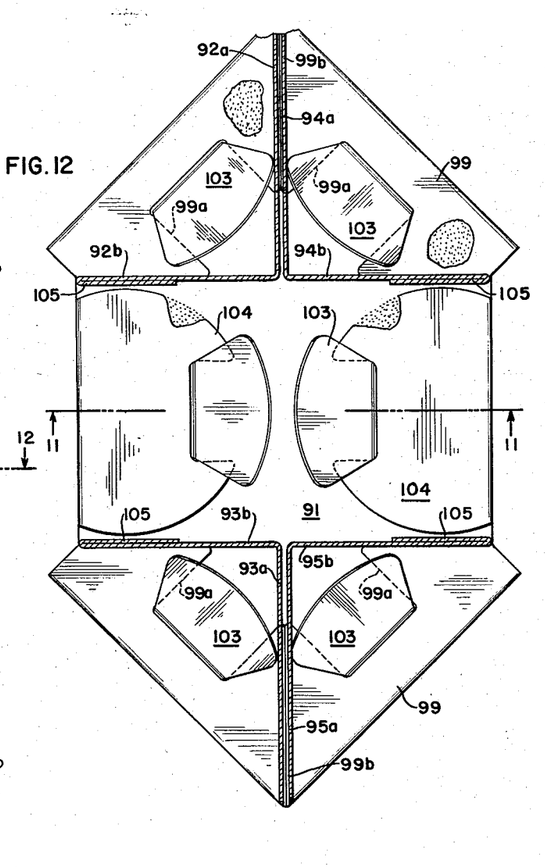
Fig. 12 is a sectional view on the line 12—12 of Fig. 11.

The carton of Figs. 11 and 12 is similar in some respects to the carton of Fig. 9, but has six compartments and a handle. The carton is made from the blank 90, shown in Fig. 13 as including an end wall 91, side wall panels 92, 93, 94, and 95, end walls 96, 97, and a handle 98. Each side wall panel is divided by a crease line into a pair of walls, such as walls 92a, 92b, and the inner ends of the side wall panels 92, 93 are spaced and, with the adjacent ends of end walls 91, 97, define an opening O, while a similar opening is defined by ends of side walls 94, 95 and end walls 91, 96. The end wall 91 forms the bottom wall of the carton and it is of generally hexagonal shape and is attached to the side walls 92b, 93b, 94b, and 95b by means of holding walls 99 having central notches 99a and glue flaps 99b at their outer ends. The end walls 96, 97 form the top wall of the carton and they are connected to the side walls 92b, 93b, 94b, and 95b by means of notched holding walls 100. The handle 98 is hinged to the wide free edge of one of the upper end walls, such as wall 96, and is made of two similar panels 98a and 98b separated by a crease line and foldable on the crease line to lie in contact. The panels have flaps 98c, which may be swung out of the panels to form finger openings and a glue flap 102 is hinged to the outer end edge of panel 98a.

Figure 13:
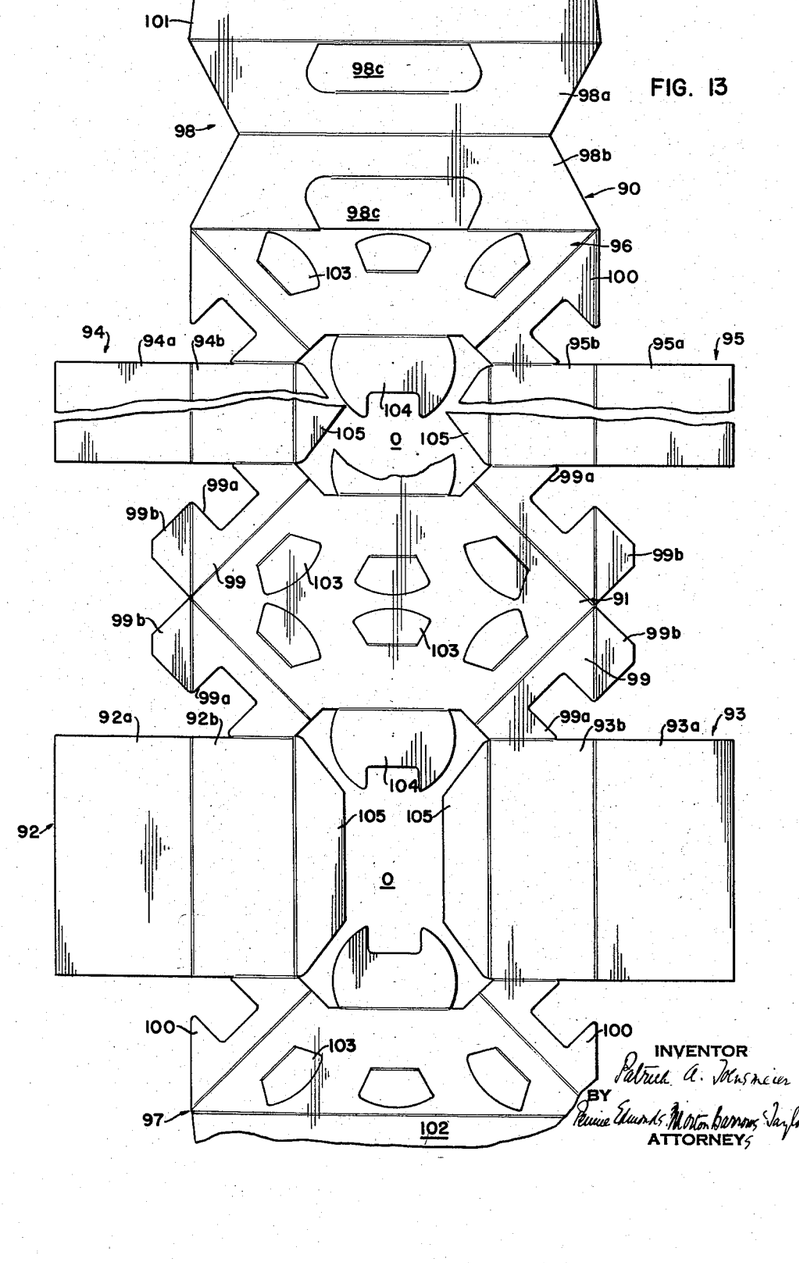
Fig. 13 is a plan view of the blank used in forming the carton of Figs. 11 and 12.

The end wall 91 is formed with retaining flaps 103 in two sets of three each and end walls 96 and 97 each have three retaining flaps 103. Holding flaps 104 with notched ends are attached to edges of end walls 91, 96, and 97 and lie within the openings O and short side walls 105 attached to the opposed edges of the side wall panels 92, 93, 94, and 95 also lie within the openings.

To erect the carton of Figs. 11 and 12, the side walls 92a, 93a, 94a, 95a are folded at right angles to their respective adjacent side walls 92b, 93b, 94b, 95b, handle sections 98a, 98b are folded into contact, and glue flap 102 is bent to lie at right angles to the upper wall 97. Holding walls 99 and 100 are then simultaneously folded inwardly upon the respective end walls 91, 96, and 97 and thus swing side walls 92b and 93b toward each other and side walls 94b and 95b toward each other. Before the pairs of side walls are in contact, the glue flaps 99b are inserted between them and, as the folding operation is carried on, glue flaps 101, 102 are brought into contact and inserted between the pairs of side walls. Finally, the retaining flaps are interlocked with the notches on the holding walls and flaps. Before the holding operations are begun, glue is applied to the proper areas on the blank so that surfaces brought into contact are secured together.

Figures 14, 15:
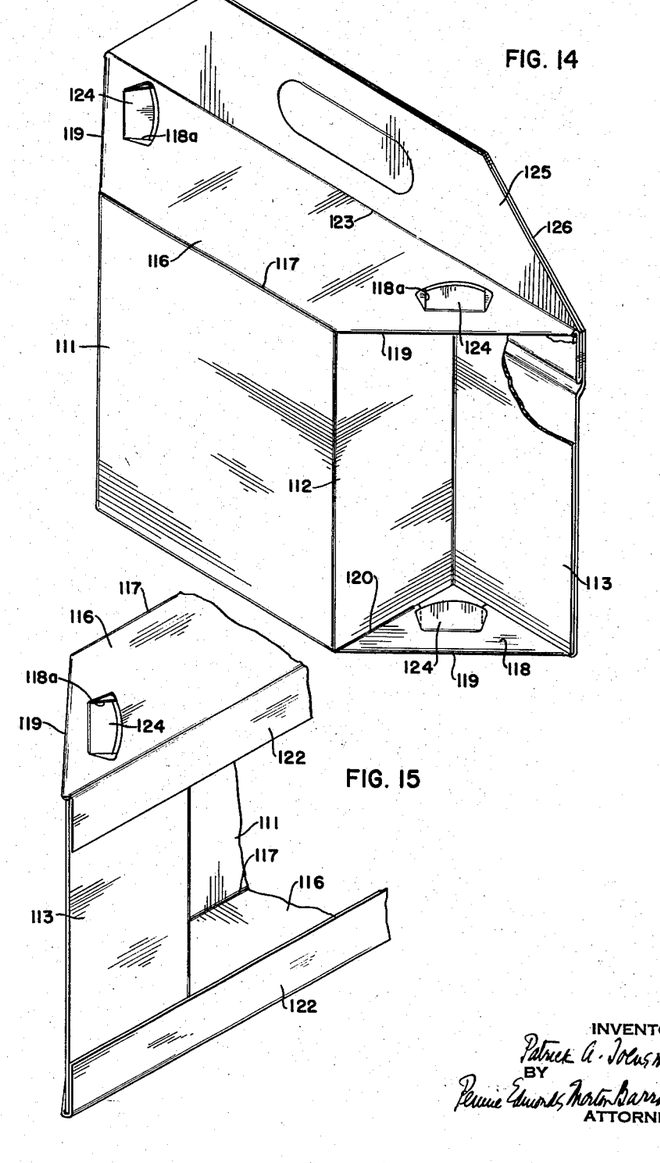
Fig. 14 is a front perspective view of a seventh form of the new carton with parts broken away.
Fig. 15 is a fragmentary rear perspective view of the carton of Fig. 14.

The carton of Fig. 14 has two triangular compartments and means for retaining one or more additional cans. The triangular compartments are at the ends of the carton and hold a pair of cans in a partially exposed condition for easy viewing, while other like cans are retained unexposed within the carton.

Figure 16:
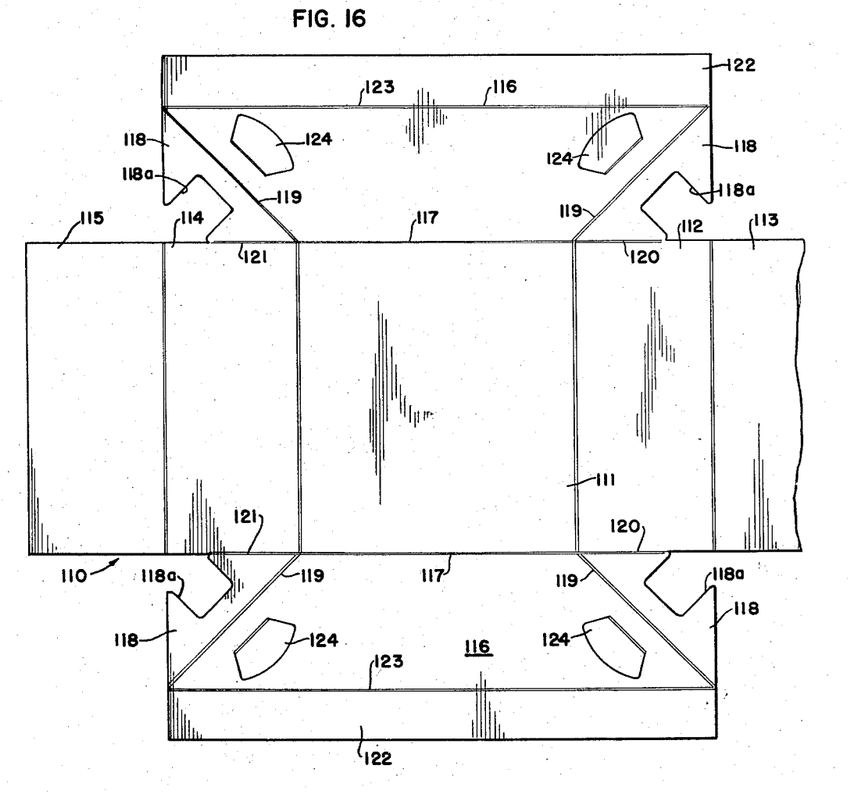
Fig. 16 is a plan view of the blank used in forming the carton of Fig. 14.

The blank 110, of which the carton of Fig. 14 is formed, is subdivided by crease lines into a front wall 111, side walls 112, 113, 114, and 115, and ends walls 116. The end walls are trapezoidal in form with their narrow ends connected to opposite edges of the front wall 111 along crease lines 117. Holding walls 118 having notches 118a are hinged to the side edges of the end walls along crease lines 119 and to the side walls 112, 114 along crease lines 120, 121, and glue flaps 123 are hinged to the wide ends of the end walls 116 along crease lines 123. Retaining flaps 124 are formed in the end walls 116 adjacent the side edges 119 only.

To erect the carton of Fig. 14, the holding walls 118 are folded upon the respective end walls 116, automatically bringing the inner side walls 112, 114 into right angular relation with the wide ends of end walls 116 and with the plane of the front wall 111. At this stage, the side walls 112, 114, end walls 116, and front wall 111 define a compartment open at the rear of the carton and adapted to receive one or more cans, depending upon the width of the front wall 112. The cans are loaded into the central compartment of the carton at this time, after which the outer side walls 113, 115 are folded at right angles to the side walls 112, 114, and glue flaps 122 are bent inwardly and secured to the side walls 113, 115. The attachment of the glue flaps to the side walls secures the carton in erected condition and, at the same time, locks the cans in the central compartment. The retaining flaps 124 are finally interlocked with the notches in the holding walls 118 and cans can then be inserted in the triangular compartments at the ends of the carton to complete the loading.

Where it is desirable to provide a handle for carrying the carton of Fig. 14, the flaps 122 are provided with extensions 125, 126, which are folded to lie against the back wall of the carton and to project above the top end wall 116.

All forms of the new carton include two or more triangular compartments, each of which consists of two side walls lying at right angles to each other and is closed at the ends by end walls having retaining flaps projecting inwardly to engage the chimes of a can. Such a combination of side and end walls produces a structure of great rigidity and, although cans in the compartment have half their circumference exposed, they are securely held in place by engagement of their chimes by the retaining flaps. The particular retaining means employed may be varied and, if desired, retaining flaps of the type, which are turned through 180° to effective position, may be used, in which event it is not necessary to interlock the flaps and the holding walls. However, the holding walls perform a function additional to that of making the retaining flaps effective, in that the holding walls form integral connections at opposite ends of each compartment between the end walls and one of the side walls of the compartment. The holding walls, accordingly, provide extra thicknesses of material at the ends of each compartment and anchor one side wall of each compartment to both end walls, so that a stiff rigid structure is produced.

I claim:

1. A carton for cans having flat ends with chimes, which comprises a pair of side walls lying parallel to each other, a second pair of side walls at opposite sides of the parallel side walls and lying aligned in a plane, the aligned side walls having side edges connected to adjacent side edges of respective parallel side walls, a one-piece end wall at each end of the pairs of side walls and closing each end of each solid angle defined by one of the parallel and one of the aligned side walls, a connecting member lying against the inner surface of each end wall in each of said solid angles, each connecting member being attached to an end edge of the parallel side wall partly defining the angle and to an edge of the end wall, means connecting the end walls to the aligned side walls, and means on each end wall in each of said solid angles for holding a can in said angle, each holding means including a retaining flap hinged to the end wall and projecting inward out of the plane of the wall and toward the apex of said angle.

2. The carton of claim 1 wherein the end walls are integrally attached through the connecting members to the side walls lying parallel and are secured to the side walls lying in a plane by glue flaps.

3. The carton of claim 1, in which the connecting members have recesses for permitting passage of the retaining flaps therethrough.

4. The carton of claim 1, in which the parallel side walls are connected together along their edges remote from the side walls lying in a plane.

5. The carton of claim 4, in which a handle is attached to the parallel side walls and projects outwardly beyond their edges connected together.

6. The carton of claim 1, in which the parallel side walls of the respective compartments are spaced apart to define a central compartment for at least one can, and the central compartment is closed at its ends by end walls integral with the compartment end walls.

7. The carton of claim 6, in which the end walls have retaining flaps extending into the central compartment for retaining a can therein.

8. A carton for cans having flat ends with chimes, which comprises a pair of compartments, each having a pair of side walls lying at right angles to each other, two of the side walls of the compartments lying in a plane and the other two walls of the compartments lying parallel, end walls closing the ends of the compartments, the walls at each end of the compartment being integral with each other, means on the end walls for engaging the inner surfaces of the chimes of cans in the respective compartments and preventing withdrawals of the cans, and a second pair of compartments of the same construction as the compartments of the first pair, the end walls at one end of the compartments of a pair being integral with the end walls at the same end of the compartments of the other pair, and the two compartments having their side walls, which lie in a plane, disposed face to face.

9. The carton of claim 8, in which the compartments of each pair are separated by a central compartment, and the central compartments are open to each other and are closed at their top and bottom by end walls integral with those of the compartments.

10. A carton for cans having flat ends with chimes, which comprises a pair of compartments, each having a pair of side walls lying at right angles to each other, two of the side walls of the compartments lying in a plane and the other two walls of the compartments lying parallel, end walls closing the ends of the compartments, the walls at each end of the compartments being integral with each other, means on the end walls for engaging the inner surfaces of the chimes of cans in the respective compartments and preventing withdrawals of the cans, a second pair of compartments of the same construction as the compartments of the first pair, one of the coplanar side walls of the compartments of one pair being integral with a like side wall of the compartments of the other pair, and the two compartments having their side walls, which lie in a plane, disposed face to face.

References Cited in the file of this patent

UNITED STATES PATENTS

| | | |
|---|---|---|
| 1,730,816 | Grigg | Oct. 8, 1929 |
| 1,897,143 | Powell | Feb. 14, 1933 |
| 1,996,778 | Wellman | Apr. 9, 1935 |
| 2,236,858 | Speeger | Apr. 1, 1941 |
| 2,554,190 | Hennessey | May 22, 1951 |
| 2,678,767 | Toensmeier | May 18, 1954 |

FOREIGN PATENTS

| | | |
|---|---|---|
| 499,573 | Belgium | Mar. 16, 1951 |